(12) United States Patent
Hoffer

(10) Patent No.: US 6,413,605 B1
(45) Date of Patent: Jul. 2, 2002

(54) TAMPER INDICATING ADHESIVE TAPE

(75) Inventor: Erik Hoffer, Somerset, NJ (US)

(73) Assignee: Consolidated Graphic Materials Inc., Somerset, NJ (US)

( * ) Notice: Subject to any disclaimer, the term of this patent is extended or adjusted under 35 U.S.C. 154(b) by 0 days.

(21) Appl. No.: 09/359,014

(22) Filed: Jul. 22, 1999

(51) Int. Cl.⁷ .................................. B32B 9/00
(52) U.S. Cl. ................... 428/40.1; 40/633; 40/665.6; 283/81; 283/101; 283/108; 283/109; 428/41.4; 428/41.8; 428/42.1; 428/201; 428/203; 428/204; 428/205; 428/352; 428/354; 428/906; 428/916
(58) Field of Search ................... 428/40.1, 41.4, 428/41.8, 201, 42.1, 202, 203, 204, 205, 906, 916, 352, 354; 283/81, 101, 108, 109; 116/200; 40/633, 665.6

(56) References Cited

U.S. PATENT DOCUMENTS 5,633,058 A  5/1997  Hoffer et al. .............. 428/40.1
5,719,828 A * 2/1998  Haas ......................... 116/200

* cited by examiner

Primary Examiner—Nasser Ahmad
(74) Attorney, Agent, or Firm—Handal & Morofsky

(57) ABSTRACT

An adhesive preventing system containing a flexible tape member that may be in the form of either a sticker or an elongated tape is disclosed. This flexible tape member has an upper and a lower side and has two patterns printed on the upper side of the flexible tape member, one of which is printed with a material that is capable of bleeding through the flexible tape member and being dispersed into the underlying materials. A pattern which does not absorb the bleed-through material is printed on the underside of the flexible tape member. The underside of the flexible tape member also has disposed on it a frangible layer of material that does not adhere to the pattern printed on the underside of the flexible tape member. An adhesive layer is disposed over the frangible layer.

6 Claims, 12 Drawing Sheets

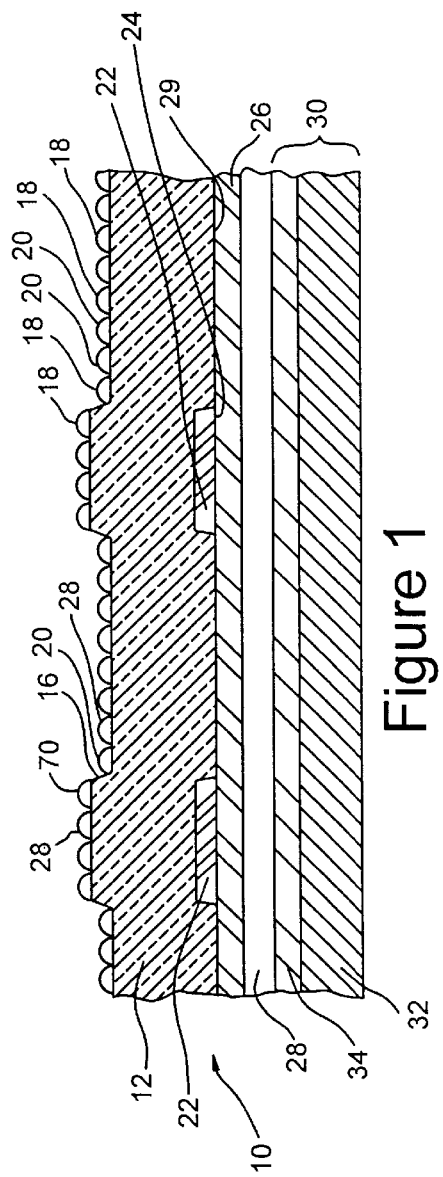
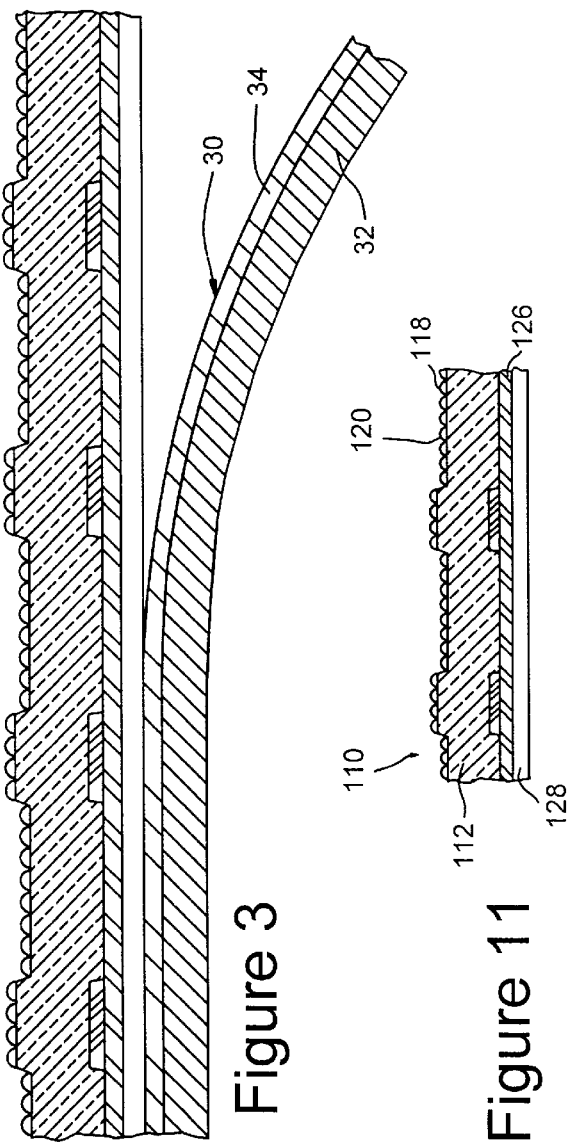

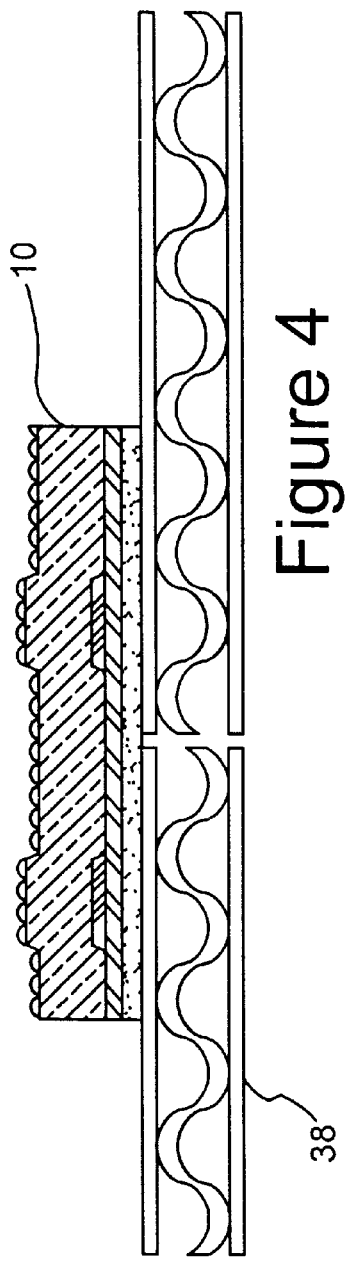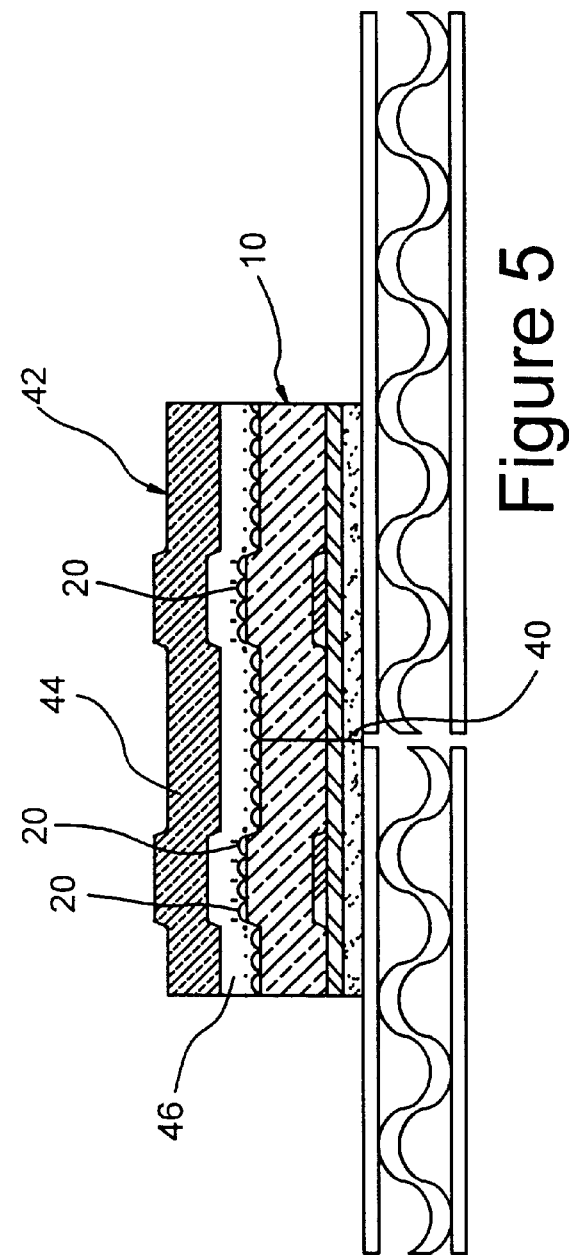

TAMPER INDICATING ADHESIVE TAPE

STATEMENT REGARDING FEDERALLY SPONSORED RESEARCH OR DEVELOPMENT (Not Applicable.)

BACKGROUND OF THE INVENTION

1. Field of the Invention

The present invention relates to tapes useful for sealing cartons and which indicate whether a package has been tampered with after sealing.

2. Description of Related Art Including Information Disclosed under 37 CFR 1.97 and 37 CFR 1.98

For over a century, mail order fulfillment has represented an increasingly important part of the economy. In a typical transaction, a customer orders a number of products, and the same are sent to him. As is apparent, the security of the package containing the products is an issue. Not too many years ago, security wias often limited to simple brown kraft paper and twine. To a large extent the (security of the contents of a package so wrapped depended largely upon the integrity of the individuals handling the package. No doubt, the thought was that relatively honest individuals were not likely to tamper with a package which was wrapped and tied with string.

However, in principle, such packages could easily be untied, opened, pilfered and rewrapped. Moreover, this could be done in a manner which was substantially not detectable.

Another very old way of sealing packages involved the use of adhesive tape. Such packages are, inherently, more resistant to tampering, because the tape cannot be easily removed, and when it is removed obvious scarring of the package, involving ripping and the like, occurs. Thus, if a customer receives a package, whose condition indicates that it has been tampered with and whose contents indicate some shortage as compared to the product ordered, the customer would be expected to alert the supplier, complain about the shortage, and advise of the fact that the package was tampered with. Upon receiving such advice, the shipper would then know that it was likely that all of the products ordered were in the box when it was sealed, but that some person along the chain of transport opened the box, removed the missing items and re-sealed the package. This would provide relatively focused information with respect to the identity of the culprits. If the situation were monitored, the names of potential wrongdoers could be tabulated and compared for various incidents, and a suspect could be identified.

While, in principle, the above strategy may still work, more sophisticated approaches to crime may substantially compromise or eliminate the possibility of detection of pilfering of simply tape sealed packages. For example, if the tape used has a water-based glue, the tape may be subjected to steam and removed from a box without damage to the box or the tape.

To overcome the last problem a so-called self adhesive tape may be used. Such a tape has an adhesive which is sticky all the time and does not require the application of water. Such adhesives are commonly used in clear cellophane and plastic tapes. In such cases, the adhesive is also made clear to preserve the transparent nature of the plastic tape. Whether or not such plastic tape is clear or not, tampering is performed by using a razor to slit open the tape sealing the carton. The carton is then opened, and some of the items in the carton or removed by the wrongdoer. The carton is then re-sealed with clear adhesive tape to preserve the look of the original carton. Indeed, such an approach will also work with cartons sealed with tapes bearing water-based adhesives. When the width of the tape being sealed is matched by the clear adhesive tape, used to re-seal the package, the disturbance is hardly noticeable.

Accordingly, alternative strategies have been devised to address such tampering. One such strategy is incorporated in a product sold by the applicant for a number of years. This product comprises a conventional tape with a water-based or self-adhesive. The tape may be paper or plastic. In this product, the outside face of the tape, that is the side of the tape without the adhesive, is printed with a pattern. The pattern is printed in two kinds of ink, one of the inks being of a permanent nature, and the other having the characteristic of the being able to migrate when covered with an adhesive of the type used in self-adhesive transparent tape.

More particularly, after the package has been sealed, if a razor is used to slit open the tape, and transparent tape used to cover the original tape after the package been tampered with and pilfered, the non-permanent ink is brought into contact with the adhesive on the transparent tape. This non-permanent ink then begins to bleed into and the migrate through the adhesive, resulting in that ink turning into a cloudy and pale blur. The remaining permanent ink then forms a permanent and bright image or message indicating tampering. This message may take the form of the word "void", the words "tampered with", or even a message such as "Do not accept", or the like.

As can be imagined, strategies may be or have been developed for avoiding detection associated with hidden message tamper indicating tapes. More particularly, the possibility exists that an opaque tape may be used to tape over slit tape. In an effort to provide a defense to this approach, I have suggested in my earlier U. S. Pat. No. 5,633,058 that the top of the tape may be coated with a material which prevents tape from being adhered to it. However, such a strategy does not work against all attempts to apply fresh tape. For example, all that is necessary to be done to overcome this defense is to apply tape having a width wider than the tape which has been slit. Nevertheless, it must be noted that such an attempt to avoid the effectiveness of the security tape does evidence tampering.

Moreover, as wrongdoers may come to recognize certain tape patterns as being likely to be tamper indicating patterns, such tamper indicating tapes become susceptible to being ineffective. For example, the possibility exists that such a tape may be carefully peeled off and then the package resealed.

However, the problem with this tape was that if the culprit retained the package for a length of time, he might notice the bleeding beginning to occur and would be tipped off to the problem. In such event, the tape could be carefully peeled off, and a suitable, usually non—transparent and wider tape used to re-seal the package.

Yet another approach employed in the prior art is the use of a frangible layer for indicating pilfering. Generally, the frangible layer is adhered to the package more strongly than it is adhered to the tape, resulting in the formation of a tamper indication message upon removal of tape from the carton.

BRIEF SUMMARY OF THE INVENTION

The present invention solves the above problems. It solves the problem of providing a tamper-indicating tape for sealing corrugated cardboard packages, as well as other packages commonly in use today. The tamper indication is provided with features which are designed to defeat clear tape overtaping, and wider tape overtaping. At the same time, the need for a coating which prevents adhesion during an over-taping operation is eliminated. Also at the same time, the inventive system provides economies in manufacture and use. In addition to the above, the inventive system provides a high degree of protection from identification as the tamper-resistant tape. Finally the same is achieved in a system which is resistant to peeling and re-sealing.

The same is achieved through the use of pre-cut lengths of tape. The pre-cut lengths of tape comprise a base tape member provided, on its top face, with a tamper indicating ink pattern printed with a first type of ink, and a camouflage ink pattern printed in a second type of ink. The underside of the tape is covered, at least in part, with the first release layer. The underside of the tape with the adhesion prevention layer on it is covered by a second release layer. An adhesive is then applied over the second release layer to complete the active adhesion portion of the tape. The third release layer is disposed over the layer of adhesive and, in turn, is adhered to a bottom member.

In accordance with the preferred embodiment, an additional measure of protection may be achieved using a four ink printing process. In particular, the tape is over printed with a pattern consisting, to the naked eye, of a relatively highly featured and complex pattern in two ink colors. In point in fact, the two ink colors are printed in four different inks, with two of the inks comprising tamper indicating pigments.

The inventive system provides the above advantages, while at the same time resulting in uniformity in the quality and strength of packaging, while minimizing waste of materials, with resultant economies in in package cost and preservation of contents.

As noted above, frangible message indicating systems are often implemented in the form of systems which employee easily removable adhesives. This is the case because there is a desire to preserve the packages, or trays, or other supplies for repeated use. In accordance with the present invention, it is contemplated that more sophisticated wrongdoers may decide upon the strategy of cutting and then taping over security tapes known to have frangible messages. In accordance with the invention, structure is provided in a frangible tape system which prevents such evasive strategy.

SUMMARY

The preferred embodiments of the adhesive preventing system according to the invention include a flexible tape member having an upper and a lower side, the upper side being printed with two patterns in two different inks, one of which migrates through the flexible tape member. On the lower side is printed a pattern that does not absorb the migrating ink. The lower side is then covered with a frangible layer and an adhesive layer. The flexible tape member may be elongated; alternatively, the tape member may be a sticker.

The adhesive preventing system may contain a backer member disposed over and protecting the adhesive layer.

The patterns printed on the upper side of the flexible tape member may be printed in the same color to produce a camouflage effect on the tape. Furthermore, the patterns printed on the underside of the flexible tape member may be printed in a pattern different from that printed on the upper side.

The frangible layer may overlay only those portions of the system on which there are no patterns. The flexible tape member may contain a clear or translucent window in it to cover over existing copy on a carton while at the same time protecting the carton through the use of the tape features. Furthermore, the tape may have disposed upon it a coating that enables the tape to be easily written on.

The tape may have serrations along at least one of its edges that cause the tape to tear into strips when it is peeled away from those edges, or it may have perforations in it at various points that cause it to tear into strips when it is peeled away from those openings.

Furthermore, in accordance with the invention the tape may be made of acetate, it may be sequentially numbered on either the face of the tape or on its back, it may be self wound and capable of being dispensed either from a tape gun or dispensed automatically. Additional features include the ability to print on the tape ,in any language. Finally, the second pattern printed on the face side of the tape that is capable of migrating through the adhesive is in the form of a logo, a design, or the wording of another language.

BRIEF DESCRIPTION OF THE SEVERAL VIEWS OF THE DRAWINGS

One or more embodiments of the invention and of making and using the invention, as well as the best mode contemplated for carrying out the invention, are described in detail below, by way of example, with reference to the accompanying drawings, in which:

FIG. 1 is a cross-sectional view of the tape system constructed accordance with the present invention;

FIG. 3 is a cross-sectional view of the tape illustrated in FIG. 1 with the backer member peeled away from the bottom of the tape;

FIG. 4 is a cross-sectional view of the inventive tape system holding the flaps of a corrugated cardboard container together;

FIG. 5 is a cross-sectional view, along the line 5—5 of FIG. 6, of the inventive tape system after being slit open and covered by a length of transparent adhesive tape;

FIG. 11 is a cross-sectional view of an alternative embodiment of the inventive tape system in a water-activated tape;

DETAILED DESCRIPTION OF THE INVENTION

Referring to FIG. 1 of the drawings, the inventive tape 10 is illustrated in FIG. 1 in cross-section. Tape 10 comprises a primary structural member 12 which may be made of any standard material used in making tape, such as acetate, polystyrene, polyester, polypropylene polyethylene, reinforced paper, paper, or the like, and have a thickness of about one to two mils. Primary structural member 12 is, in accordance with the present invention, contemplated as being the starting material in the process for making tape 10.

Primary structural member 12 is a flat, planar, mechanically matte or clear material, and although, at least theoretically there may be some minimal distortion of the same during the manufacturing process, any such distortion, if it occurs, is minimal and microscopic. In any case, such a possibility is illustrated in the Figures in greatly exaggerated form for purposes of clarity of illustration.

Figure 2:
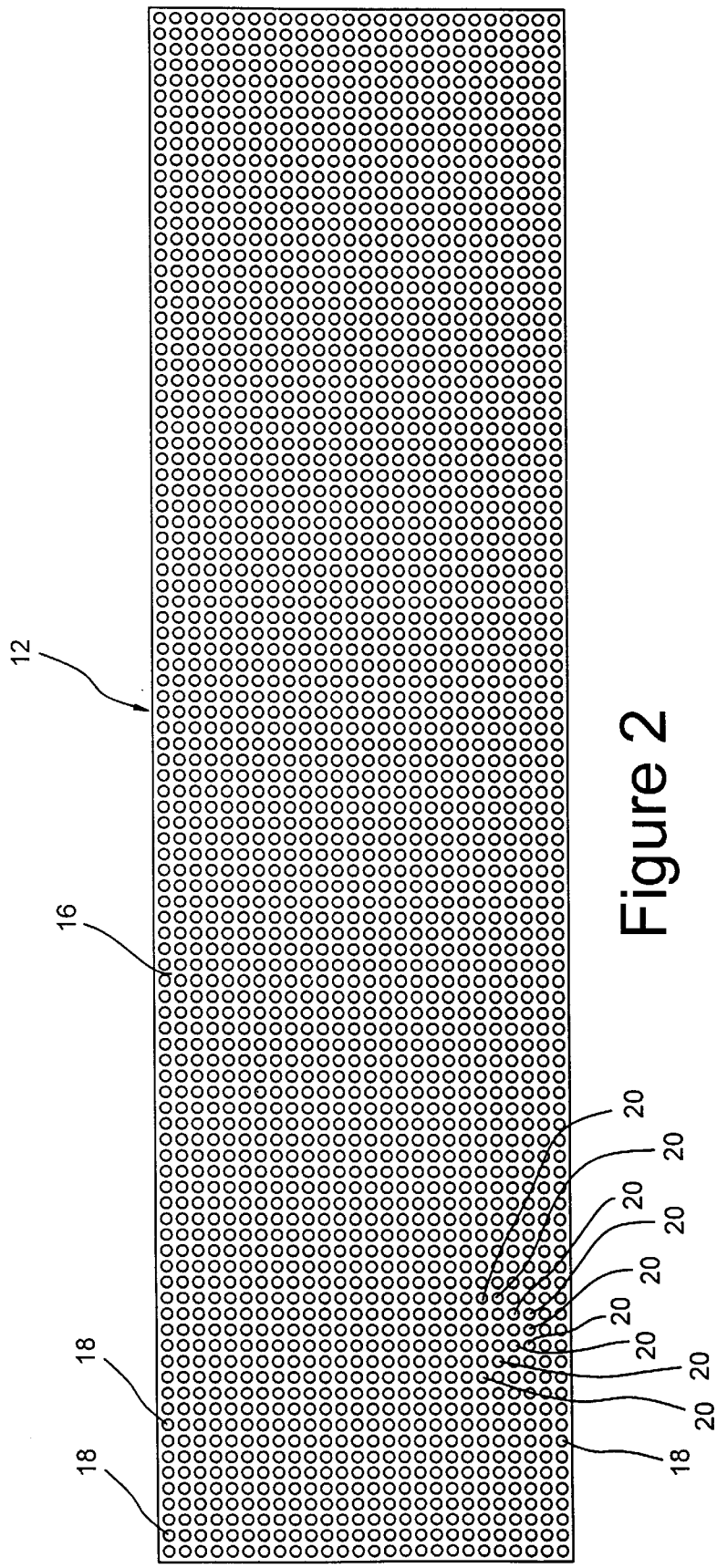
FIG. 2 is a top plan view of the tape member illustrated in FIG. 1.

As can be seen most clearly in FIG. 2, the top face 16 of primary structural member 12 is in printed with a matrix of permanent pigment dots 18 and migrating pigment dots 20. Migrating pigment dots 20 are arranged in such manner as to form an image which indicates tampering after they have been given the opportunity to migrate and fade, as will be described in detail below. The image indicating tampering may be in the shape of a company logo or a design, or it can be a written message in the words of any language. Migrating pigment dots are printed in micro-encapsulated orange or other color dye, such as Gotham Ink's adhesive-sensitive orange.

The other side of primary structural member 12 is printed with a release agent 22. Release agent 22 is printed or otherwise adhered to the underside 24 of primary structural member 12 and formed in the pattern of a second tamper indicating image, as will be described in detail below.

Remaining portions of primary structural member 12, left uncovered by release agent 22, as well as the bottom surfaces 24 of release agent 22 are covered with a frangible layer 26 of material which adheres itself to the underside 29 of primary structural member 12. However, there is no adhesion between frangible layer 26 and release agent 22. The patterned release coat layer 22 is made from a premixed water-based material, such as Ashland Chemical's Aroset No. 7551.

Frangible layer 26 may be applied by applying heat and pressure to a preexisting strip of the material to cause it to form a unitary member with primary structural member 12. Alternatively, frangible layer 26 may be formed from a liquid material applied using a printer or similar apparatus using inks that are used in the industry and that are not part of the present invention.

Frangible layer 26 is made of a material selected for relative weakness, compared to the gripping power of the adhesives described below and inherent strength of primary structural member 12, and its likeliness to fracture and break apart in response to mechanical stress.

The adhesion portion of the tape of the present invention is completed by a layer of adhesive 28 which overlies frangible layer 26, as illustrated in FIG. 1. Adhesive 28 is deposited in a layer having a thickness between 0.6 and 1.0 mils. While a wide range of materials and thicknesses may be used, in accordance with the preferred embodiment, a solvent-based acrylic adhesive is used, such as Ashland Chemical's Aroset No. 351. It is noted that adhesive 28 is a so-called temporary adhesive. In particular, adhesive 28 may be removed by gentle rubbing with a finger, thus removing the indication that a package has been opened. Persons using such tamper indicating products are trained to look for the indication of opening because the absence of the same indicates tampering.

In accordance with the present invention, adhesion of a tape over the top surface of the inventive tape will cause the non-permanent ink that forms the top layer of the tape to migrate through the glue, become dispersed and effectively visible to form a tamper indicating message. Accordingly, in the case of a self-adhesive tape in accordance with the present invention, the tape is provided with a backer 30, which comprises a backer member 32 made of plastic, paper or the like and a layer of release material 34, such as wax or silicone, which is adhered, albeit very unaggressively to the underside of the layer of adhesive 28. This completes the structure of the inventive tape. In accordance with the preferred embodiment of the invention, the release liner or backer 30 is a siliconized, supercalendared kraft paper or film liner with a very easy release level, that is something on the order of less than 10 grams/in., when exposed to a 180 degree pull at 300 inches per minute.

In accordance with the present invention, the inventive tape is provided in strips of predetermined size, tailored to exactly fit specified requirements for packages being shipped. Such sizes are not well defined, as some products may require more tape than others. For example, heavier products may require tape having a greater length, to provide more gripping power along the sides of the package.

The use of precut tape sizes results in uniformly high quality in the integrity of packages using the inventive tape, while also minimizing waste.

In accordance with the present invention, further economies are achieved through the coordination of package sizes and tape sizes. In particular, it is contemplated that the tape may be sold or marketed for use with a carton system having cartons of different sizes that share common tape length requirements. For example, the small dimension of a carton of one size may be the same size as the large dimension of a smaller carton, thus requiring only three sizes of tape for the two carton sizes. The number of tape length sizes can be reduced to two if one of the boxes has an open top that is square. In principle, three tape lengths can accommodate four carton sizes of uniform height and more sizes if heights are varied.

For example, consider tape lengths of one, two and three feet. There could be used to seal a 1 by 1,1 by 2,2 by 2,2 by 3,1 by 3 and 3 by 3 cartons of various height.

In principle, it is also possible that the tape illustrated in FIG. 1 may be put into roll form for use by the consumer. Commercially available tape dispensing guns or other special dispensers, which are available on the market today, may be used to remove the backer as the tape is consumed from the dispenser.

Use of the tape as illustrated in FIG. 3 requires removal of backer 30. This results in exposing adhesive 28, allowing the inventive tape 10 to be used by application to sealing a carton 38, as illustrated in FIG. 4. Alternatively, silicone coating may be applied to the block area of the face allowing the tape to be rolled on itself without the backer. Such silicone is commercially available from Spectra, Inc., as part number WSO-109.

The tape 10 can be made suitable for a signature by applying a coating on the surface suited to being written on. These coatings are well known in the art and are available in many forms, such as solvent topcoating part number V135943 from Zeneca, Inc.

Figure 17:
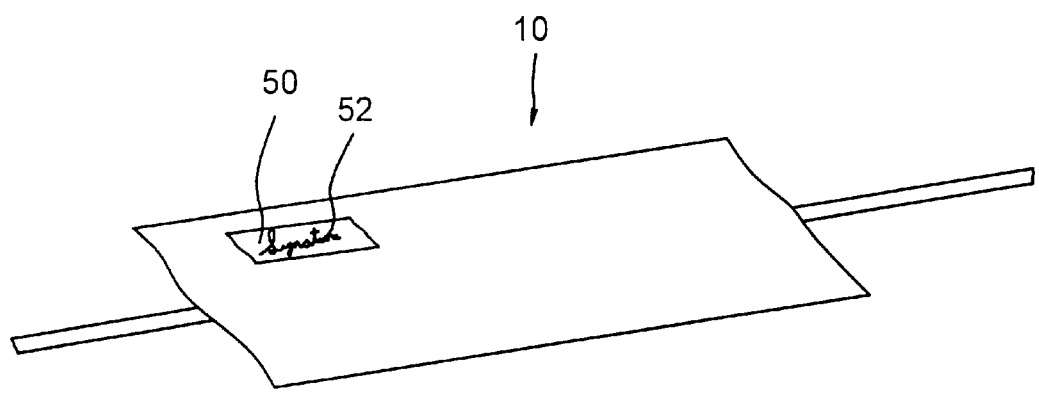
FIG. 17 is a plane view showing the inventive tape with a window that covers over existing writing on a package.

Alternatively, as shown in FIG. 17, the tape 10 can be made with a window 50 to cover over existing writing on the package 52 while protecting it through the use of features of the tape 10. In this embodiment, a section in the tape 10 is replaced with a section of clear or translucent material. Writing 52 or symbols can be viewed through the window 50 when the tape 10 is placed over, writing 52 or symbols.

Figure 6:
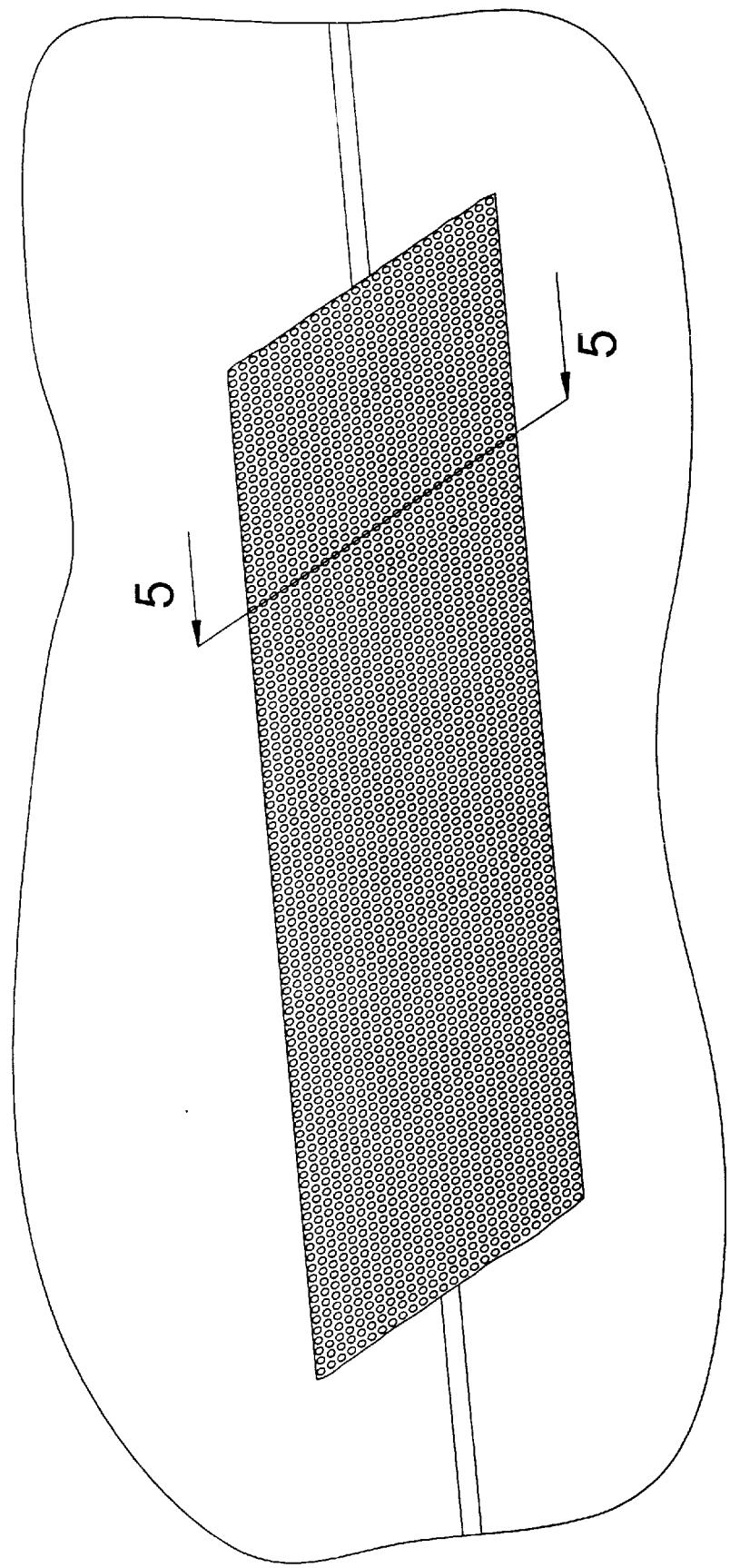
FIG. 6 is an isometric view of the top of the tape positioned over the flaps of a container.

In order to understand the tamper indicating feature of the invention, reference is made to FIG. 5 here. A knife has been used to cut the tape, leaving a slit 40. In order to cover slit 40, the wrongdoer has applied a layer of adhesive tape 42 over inventive tape 10. Adhesive tape 42 includes a clear plastic layer 44 and an adhesive layer 46. As can be seen in FIG. 5, the pattern of dots 18 and 20 is intact immediately after overtaping with clear adhesive tape 42. This is illustrated in plan view in FIG. 6. However, with the passage of time, the situation illustrated in FIGS. 5 and 6 evolves into the situation illustrated in FIG. 7.

Figure 7:
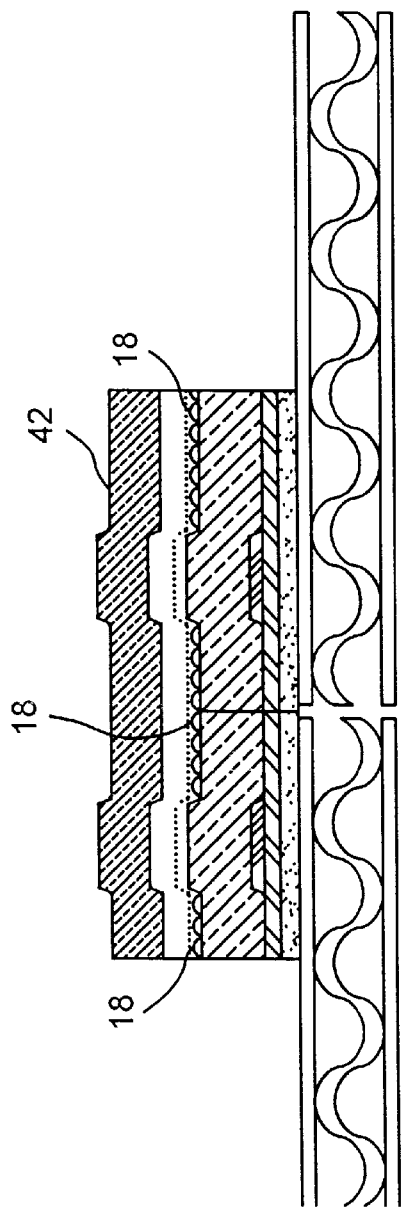
FIG. 7 is a cross-sectional view of the inventive tape system showing activation of one of the tamper mechanisms.
Figure 8:
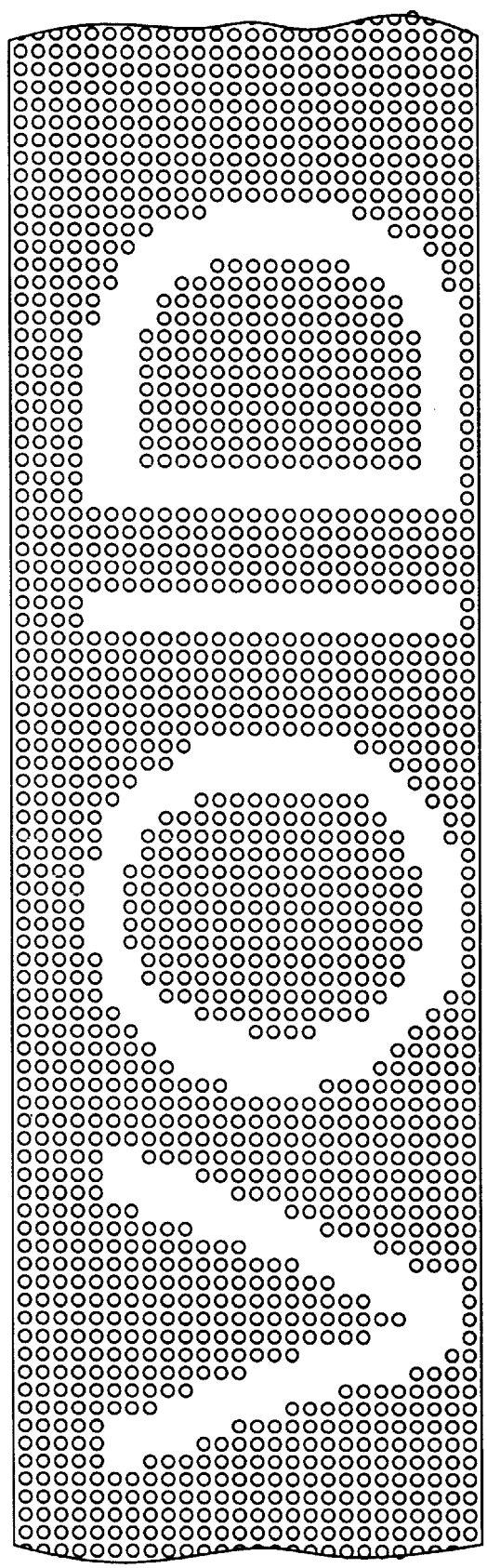
FIG. 8 is a top view of the inventive tape system after activation has exposed, a message indicating that tampering has occurred.

In FIG. 7, one sees that the dots printed in permanent ink 18 remain in place on the tape and visible through transparent tape 42. However, dots printed in migrating ink 20 have migrated into adhesive 46 and been dispersed, rendering them substantially changed in appearance. The resultant view through transparent tape 42 is illustrated dramatically in FIG. 8.

Figure 10:
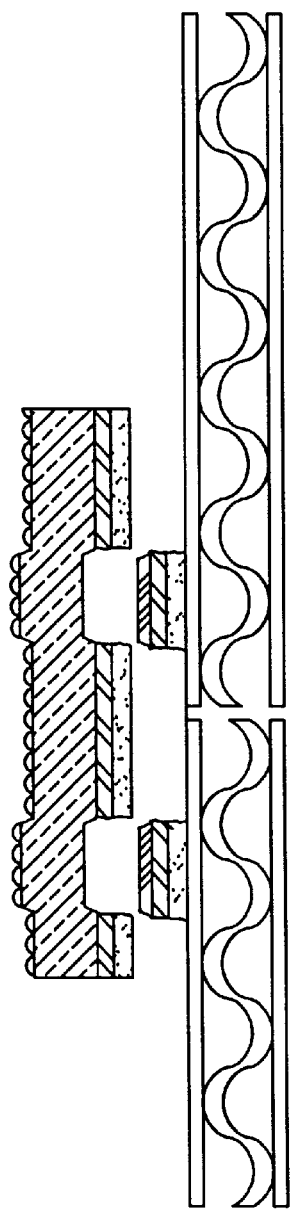
FIG. 10 is a cross-sectional view of the inventive tape system after being partially removed leaving behind the second indication that tampering has occurred.
Figure 9:
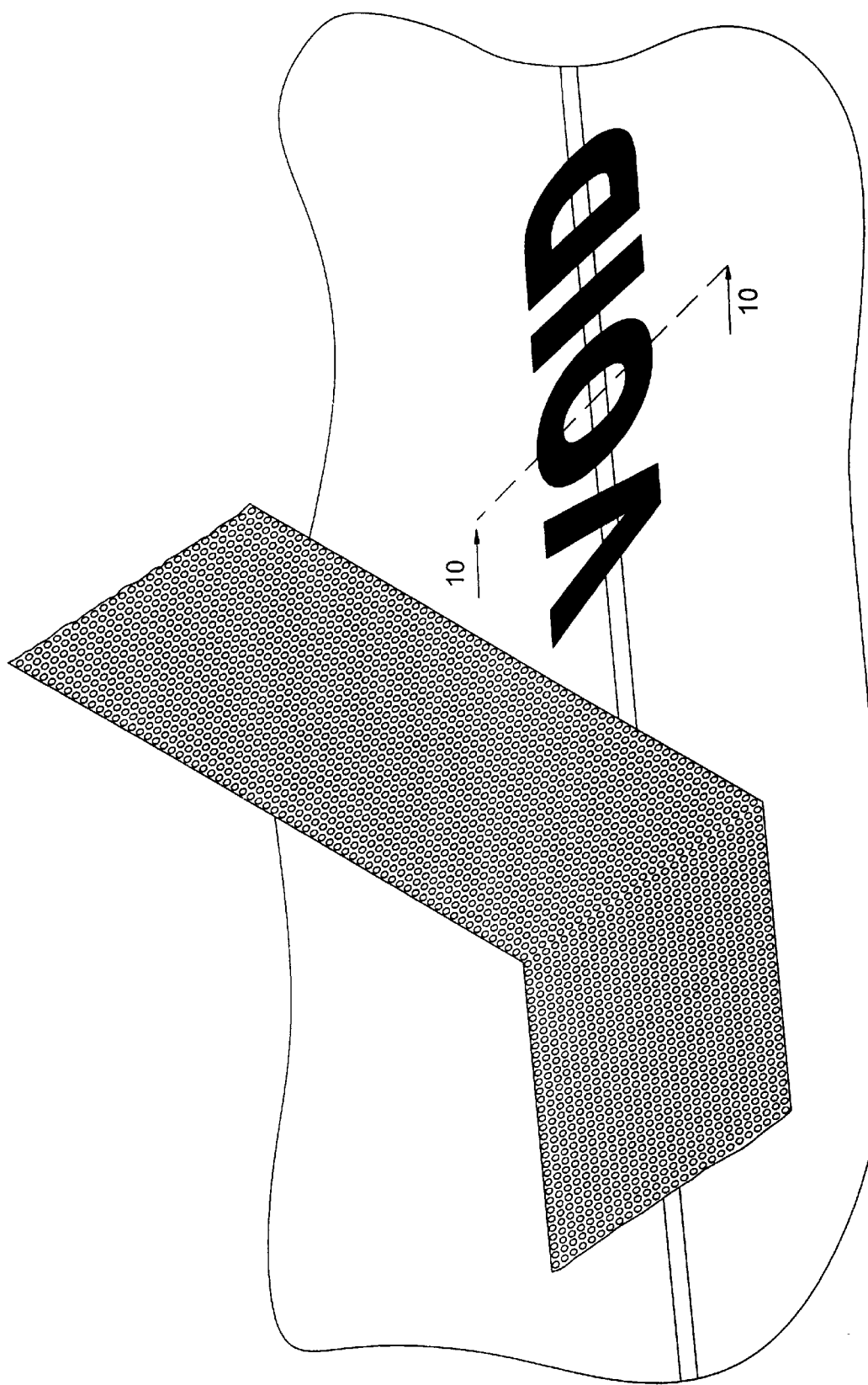
FIG. 9 is an isometric view of the inventive tape system after being partially removed resulting in a second tamper indication.

If, on the other hand, the culprit tries to peel off the tape, separation of tape 10 from carton 38 will result in the situation illustrated in perspective in FIG. 9 and in cross-section in FIG. 10. The result will be a tamper indication as illustrated in FIG. 9.

Figure 18:
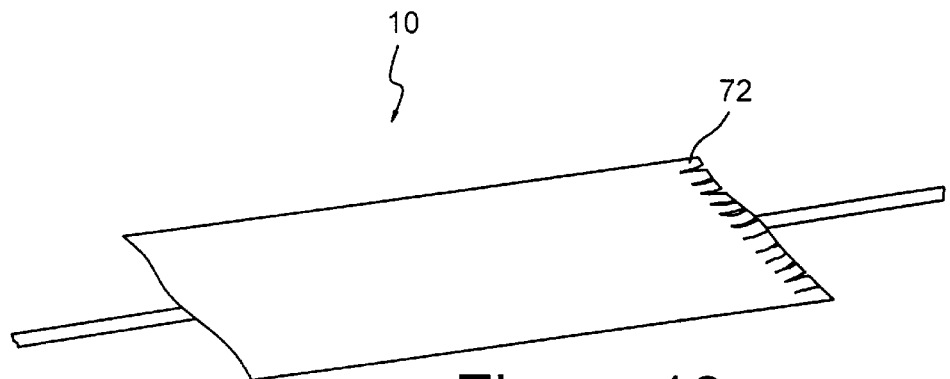
FIG. 18 is a plane view of the inventive tape having serrations at its ends as a tamper resistant feature.
Figure 19:
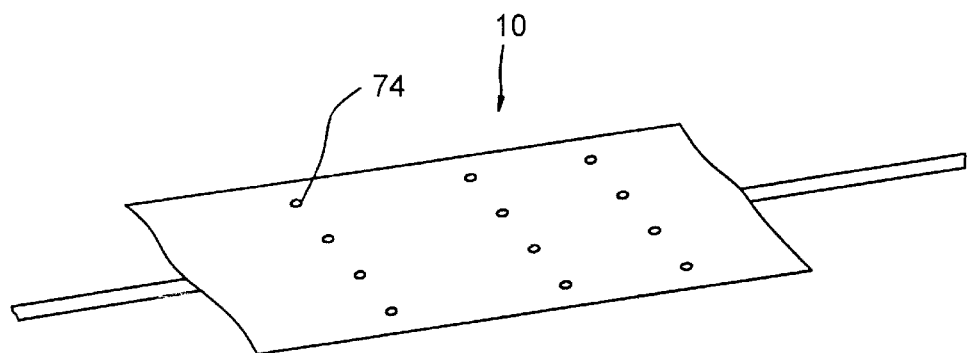
FIG. 19 is a plane view of the inventive tape having tamper slits along its length as a tamper resistant feature.
Figure 20:
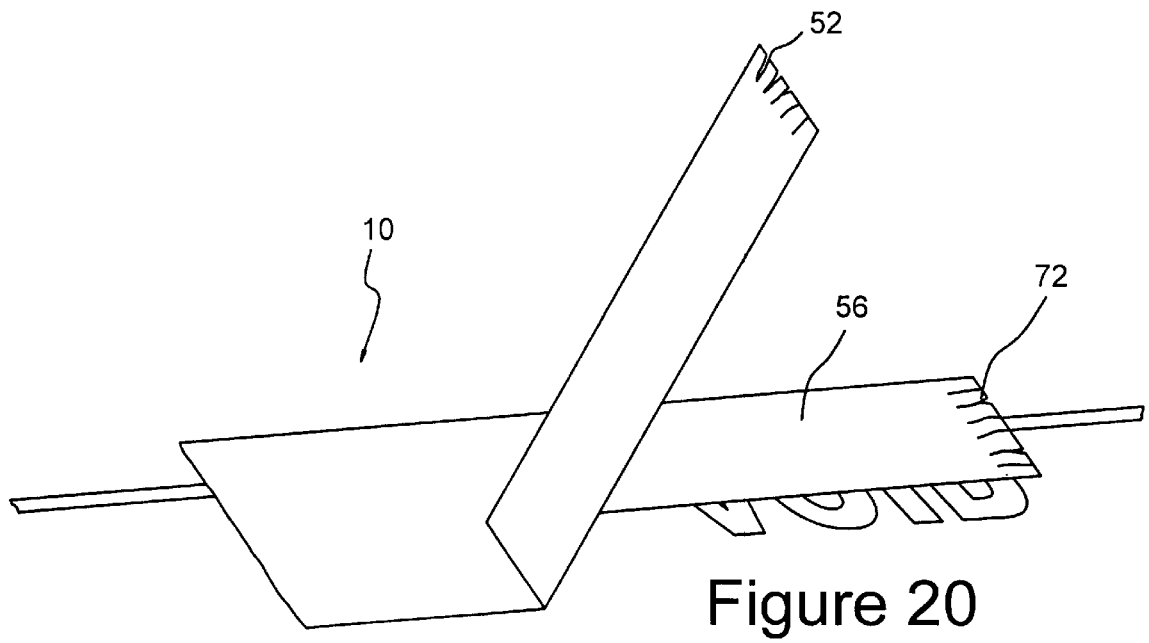
FIG. 20 is a plane view of the inventive tape ripping lengthwise as a result of the tape being reaching a tamper resistant slit as it is being removed.

The tape 10 may also contain serrations 72 at its ends, as shown in FIG. 18, or it may contain tamper slits 74 at intervals along the tape 10, as shown in FIG. 19. When the tape 10 is being removed from the carton along a serration 72, or as a tape 10 being'removed reaches a tamper slit 74 in the tape 10, the tape 10 will rip lengthwise leaving a lengthwise portion remaining on the carton, as shown in FIG. 20.

In accordance with a present invention, it is also contemplated that the above principles may be applied to paper tape with a water activated adhesive. In this embodiment and in subsequent embodiments, elements of the invention performing analogous or equivalent functions are numbered with numbers which are 100 or a multiple of 100 different from the corresponding parts in the earlier embodiments. Such a tape 110, constructed in accordance with the present invention, is illustrated in FIG. 11. Tape 110 includes a main paper tape member 112, permanent dots 118, migrating ink dots 120, and water activated adhesive 128.

In accordance with the present invention, it is contemplated that, in order to provide a measure of security, the tape will be made or marked with the name of a manufacturer, a design, a company logo, or the wording of any language.

Figure 12:
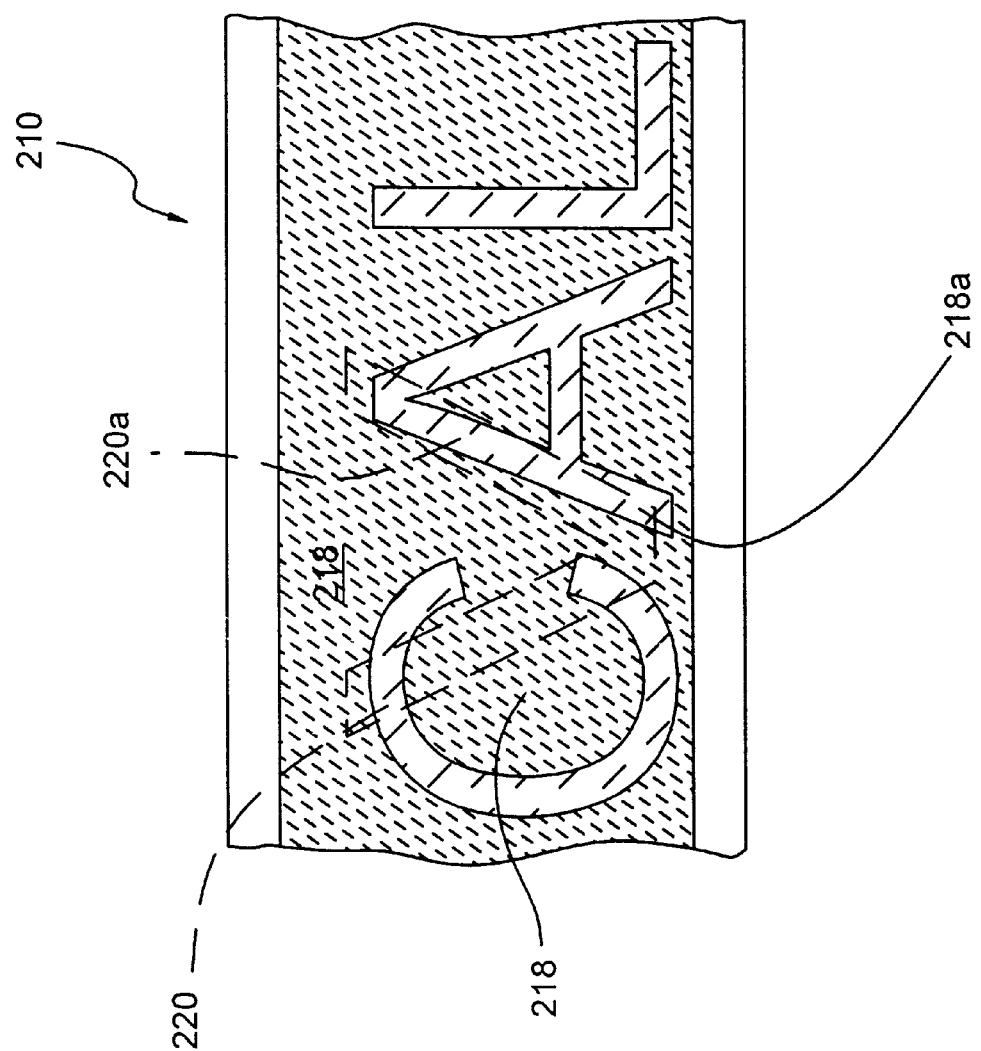
FIG. 12 is a top view of another alternative embodiment of the inventive tape which uses four inks.

Such a tape 210 is illustrated in FIG. 12. Importantly, FIG. 12 also has another security feature. In particular, the tamper indication is camouflaged in the printed pattern and the lack of regularity in both patterns improves the camouflage.

More particularly, tape 210, which has all the same elements as tape 10, for example, differs only insofar as the pattern of permanent and migrating inks is different. In particular, there are four types of ink in two colors applied to the top face of tape 210. Different crosshatching patterns are used to indicate the various inks. These inks include an area printed with a permanent ink in a first color 218, a migrating ink in the first color 220, a permanent ink in a second color 218a, and a migrating ink in that second color 220a. The inks used can be of a multitude of colors so as to give the tape variations in color along its lengths.

Figure 13:
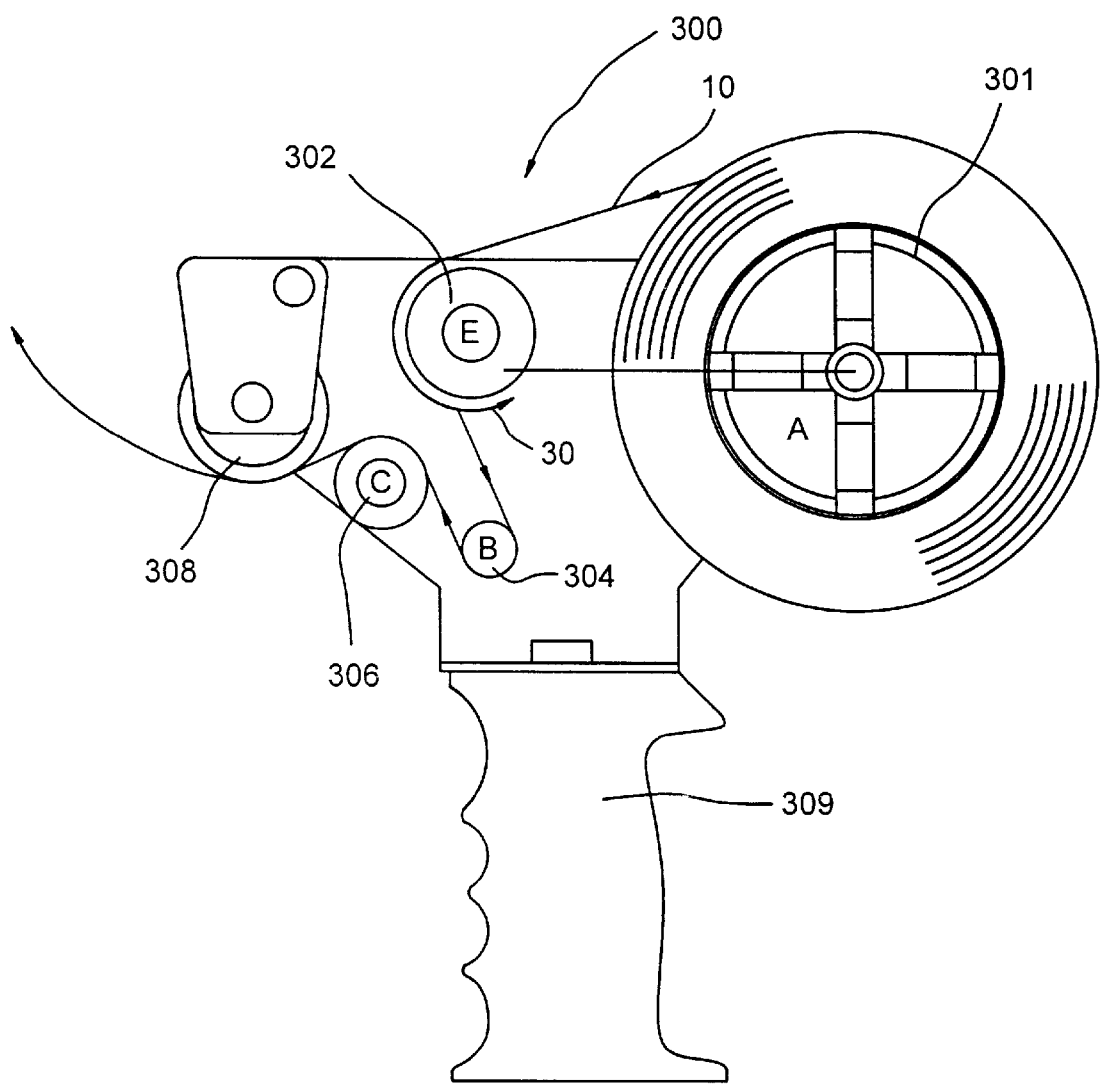
FIG. 13 is a side view of a tape dispenser.

A dispenser for dispensing the inventive tape of the type having a backer is illustrated in FIG. 13.

Figure 14:
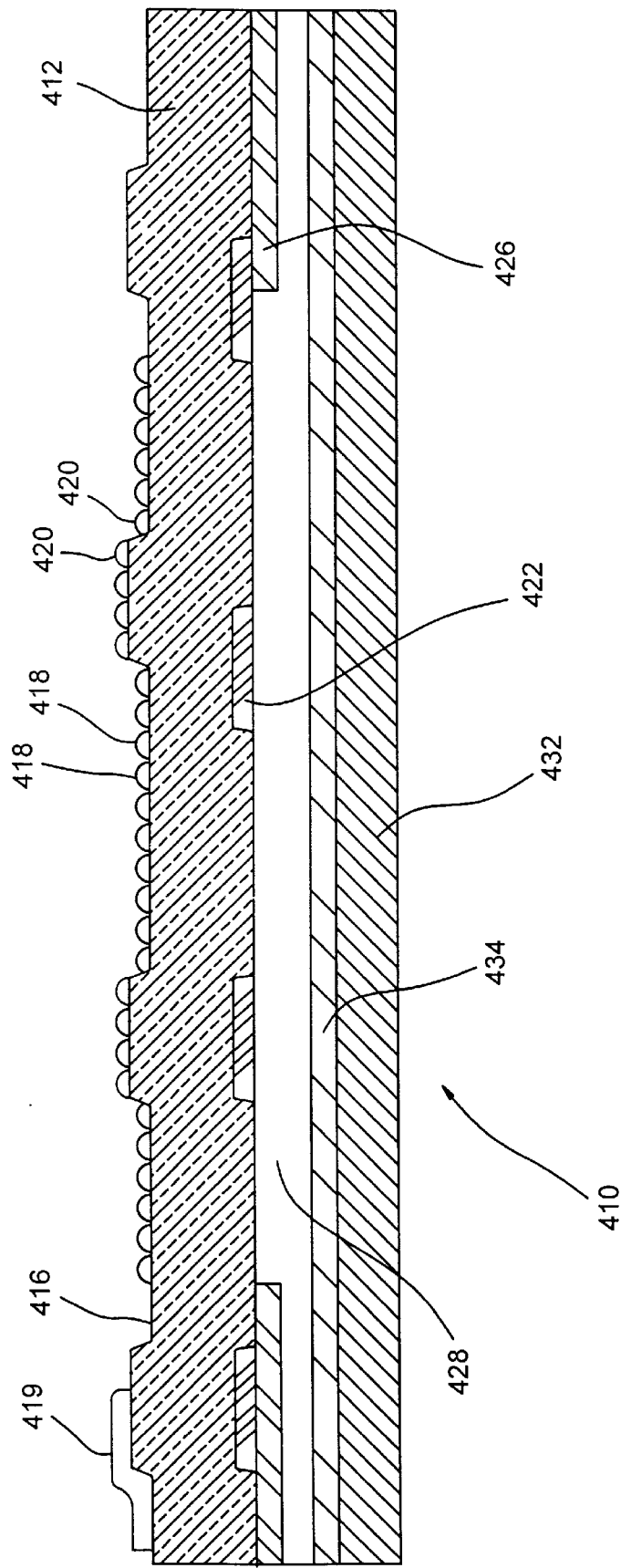
FIG. 14 is a cross-sectional view of still yet another alternative embodiment of the inventive tape.

Referring to FIG. 14 of the drawings, the inventive tape 410 is illustrated in FIG. 14 in cross-section. Tape 410 comprises a primary structural member 412 which may be made of any standard material used in making tape, such as acetate, polystyrene, polyester, polypropylene polyethylene, reinforced paper, paper, or the like, and have a thickness of about one to two mils. Primary structural member 412 is, in accordance with the present invention, contemplated as being the starting material in the process for making tape 410.

Figure 15:
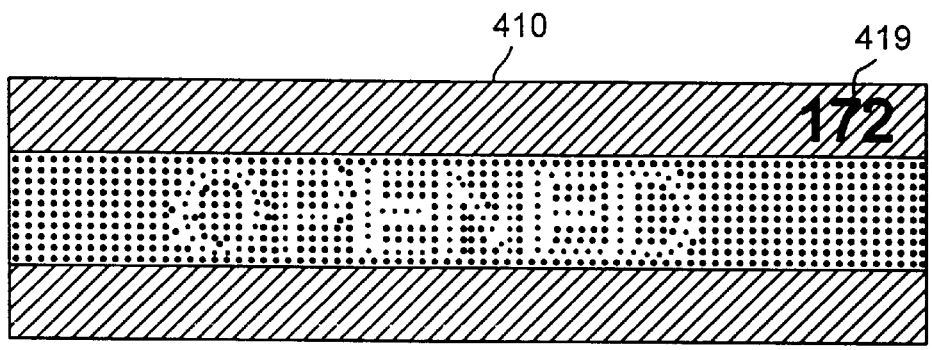
FIG. 15 is a top view of tape illustrated in FIG. 14.

Primary structural member 412 is a flat, planar, mechanically matte material, and although, at least theoretically there may be some minimal distortion of the same during the manufacturing process, any such distortion, if it occurs, is minimal and microscopic. In any case, such a possibility is illustrated in the Figures in greatly exaggerated form for purposes of clarity of illustration. As can be seen most dearly in FIG. 15, the top face 416 of primary structural member 412 is in printed with a matrix of permanent pigment dots 418, a permanent ink number 419 (which may appear every thirty centimeters along the length of tape 410) that increments up by a digit each time it is printed to provide an added measure of security, and migrating pigment dots 420. Migrating pigment dots 420 are arranged in such manner as to form an image which indicates tampering after they have been given the opportunity to migrate and fade, as will be described in detail below. Migrating pigment dots are printed in micro-encapsulated orange or other color dye, such as Gotham Ink's adhesive-sensitive orange.

The other side of primary structural member 412 is printed with a release agent 422. Release agent 422 is printed or otherwise adhered to the underside 424 of primary structural member 412 and formed in the pattern of a second tamper indicating image, as will be described in detail below.

Remaining portions of primary structural member 412, left uncovered by release agent 422, as well as the bottom surfaces 424 of release agent 422 are covered with a frangible layer 426 of material which adheres itself to the underside 429 of primary structural member 412. However, there is no adhesion between frangible layer 426 and release agent 422. The patterned release coat layer 422 is made from a pre-mixed water-based material, such as Ashland Chemical's Aroset No. 7551.

Figure 16:
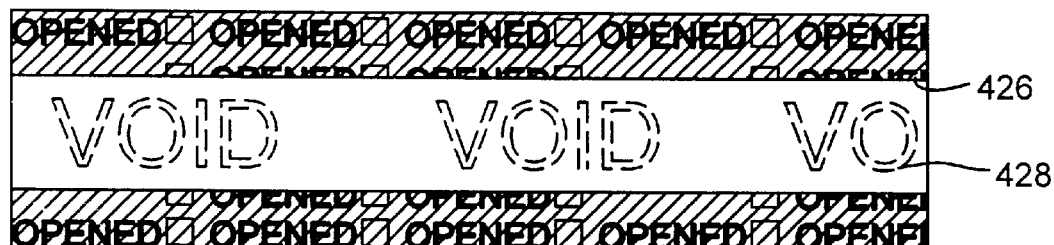
FIG. 16 is a top view of the residue remaining once the tape of FIG. 14 has been lifted and removed.

Frangible layer 426 may be applied by applying heat and pressure to a pre-existing strip of the material to cause it to form a unitary member with primary structural member 412. This is desired so that if the tape is removed, it will leave behind an indication as illustrated in FIG. 16. It is noted that in this embodiment, the central portion of the rip-off activated layer consists only of adhesive 428, which is less visible and performs an added security function as a second element that should be seen when an untampered package is opened by the pulling up of the tape. It is also noted that all of the adhesives are not permanent in this embodiment so that the same may be easily removed and the package or tray recycled.

Alternatively, frangible layer 426 may be formed from a liquid material applied using a printer or similar apparatus using inks that are used in the industry and that are not part of the present invention.

Frangible layer 426 is made of a material selected for relative weakness, compared to the gripping power of the adhesives described below and inherent strength of primary structural member 412, and its likeliness to fracture and break apart in response to mechanical stress.

The adhesion portion of the tape of the present invention is completed by a layer of adhesive 4281 which overlies frangible layer 426, as illustrated in FIG. 14. Adhesive 428 is deposited in a layer having a thickness between 0.6 and 1.0 mils. While a wide range of materials and thicknesses may be used, in accordance with the preferred embodiment, a solvent-based acrylic adhesive is used, such as Ashland Chemical's Aroset No. 351. It is noted that adhesive 428 is a so-called temporary adhesive. In particular, adhesive 428 may be removed by gentle rubbing with a finger, thus removing the indication that a package has been opened. Persons using such tamper indicating products are trained to look for the indication of opening because the absence of the same indicates tampering.

While illustrative embodiments of the invention have been described above, it is, of course, understood that various modifications will be apparent to those of ordinary skill in the art. Many such modifications are contemplated as being within the spirit and scope of the invention.

What is claimed is:

1. An adhesion preventing member comprising
   (a) a flexible tape member having a face side and a reverse side;
   (b) a first pattern printed on said face side;
   (c) a second pattern printed on said face side, said second pattern being made of a material which has a characteristic of migrating through adhesive;
   (d) an adhesion preventing member disposed in a pattern on the reverse side of the flexible tape member;
   (e) a frangible indicating member disposed over said adhesion preventing member and portions of staid reverse side adjacent said adhesion preventing member; and
   (f) an adhesive layer disposed over said frangible indicating member wherein said adhesion preventing member defines serrations along at least one edge of said tape, said serrations configured, positioned and dimensioned to cause said adhesion preventing member to tear into strips while being peeled away.

2. An adhesion preventing member comprising
   (a) a flexible tape member having a face side and a reverse side;
   (b) a first pattern printed on said face side;
   (c) a second pattern printed on said face side, said second pattern being made of a material which has a characteristic of migrating through adhesive;
   (d) an adhesion preventing member disposed in a pattern on the reverse side of the flexible tape member;
   (e) a frangible indicating member disposed over said adhesion preventing member and portions of said reverse side adjacent said adhesion preventing member; and
   (f) an adhesive layer disposed over said frangible indicating member wherein said adhesion preventing member defines tamper-slits in said adhesion preventing member, said tamper-slits causing said adhesion preventing member to tear into strips if a wrongdoer attempts to peel said member of a package to which it has been applied.

3. An adhesion preventing member comprising
   (a) a flexible tape member having a face side and a reverse side;
   (b) a first pattern printed on said face side;
   (c) a second pattern printed on said face side, said second pattern being made of a material which has a characteristic of migrating through adhesive;
   (d) an adhesion preventing member disposed in a pattern on the reverse side of the flexible tape member;
   (e) a frangible indicating member disposed over said adhesion preventing member and portions of said reverse side adjacent said adhesion preventing member; and
   (f) an adhesive layer disposed over said frangible indicating member wherein said adhesion preventing member comprises acetate.

4. An adhesion preventing member according to claim 1, further comprising a backer member disposed over and protecting said adhesive, wherein said first pattern and said second pattern are printed in the same two colors, and said second pattern is camouflaged by said first pattern, wherein said first pattern is printed on a portion of said face side on which said second pattern is not printed, wherein said frangible indicating member only overlies portions of said flexible tape member over which said first and second pattern are not disposed, wherein said adhesion preventing member contains a clear or translucent window in it, wherein said face of said adhesion preventing member has disposed upon it a coating that is suited to being written on.

5. An adhesion preventing member according to claim 2, further comprising a backer member disposed over and protecting said adhesive, wherein said first pattern and said second pattern are printed in the same two colors, and said second pattern is camouflaged by said first pattern, wherein said first pattern is printed on a portion of said face side on which said second pattern is not printed, wherein said frangible indicating member only overlies portions of said flexible tape member over which said first and second pattern are not disposed, wherein said adhesion preventing member contains a clear or translucent window in it, wherein said face of said adhesion preventing member has disposed upon it a coating that is suited to being written on.

6. The adhesion preventing member of claim 5, wherein said adhesion preventing member is made from acetate.

* * * * *